Feb. 11, 1958 J. A. MILLER 2,822,706
FIVE SPEED TRANSMISSION USING SIMPLE PLANETARY GEAR SETS
Filed Dec. 17, 1956 2 Sheets-Sheet 1

INVENTOR.
JAMES A. MILLER
BY
*J. Frederick Bechtel*
ATTORNEY

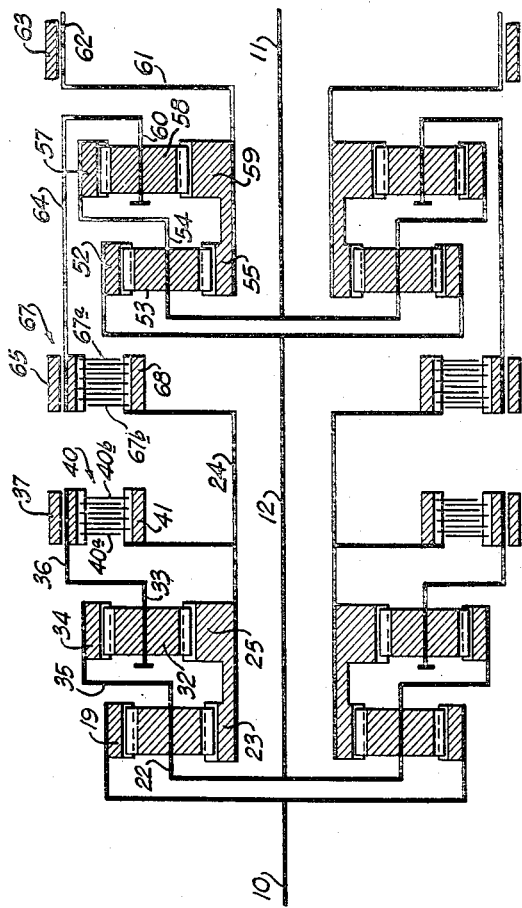

United States Patent Office 2,822,706
Patented Feb. 11, 1958

2,822,706

FIVE SPEED TRANSMISSION USING SIMPLE PLANETARY GEAR SETS

James A. Miller, Battle Creek, Mich., assignor to Clark Equipment Company, a corporation of Michigan Application December 17, 1956, Serial No. 628,825

8 Claims. (Cl. 74—763)

This invention relates generally to multispeed transmissions and, more particularly, to a five speed planetary transmission of the type especially well suited for use in trucks and other similar heavy duty vehicles.

The invention has for its principal object the provision of an improved transmission characterized by simple, compact construction and simplicity of installation and maintenance.

It is also an object of this invention to provide an improved transmission having five forward speed drive ratios and one reverse speed with all ratios being effected by the engagement of controllable friction devices whereby a change of speed ratio may be accomplished without interrupting the flow of torque from the vehicle engine.

It is a further object of the present invention to provide an improved transmission employing three band brakes and two multiple-disk friction clutches which are arranged to be actuated in different pairs in order to complete the aforementioned five forward speed ratios and the reverse drive.

A further object of the present invention is the provision of an improved transmission employing four simple, single pinion type planetary gear sets so arranged and interconnected that the aforementioned five forward speed ratios and the reverse drive may be effected while employing a minimum number of controllable friction devices of the type described above.

The invention, both as to its organization and manner of operation, together with further objects and advantages thereof, will best be understood by reference to the specification taken in conjunction with the accompanying drawings wherein:

Fig. 2 is a schematic diagram of the transmission shown in Fig. 1; and

Fig. 3 is a table showing the various pairs of controllable friction devices which are engaged to complete the different drive ratios through the transmission.

Figure 1:
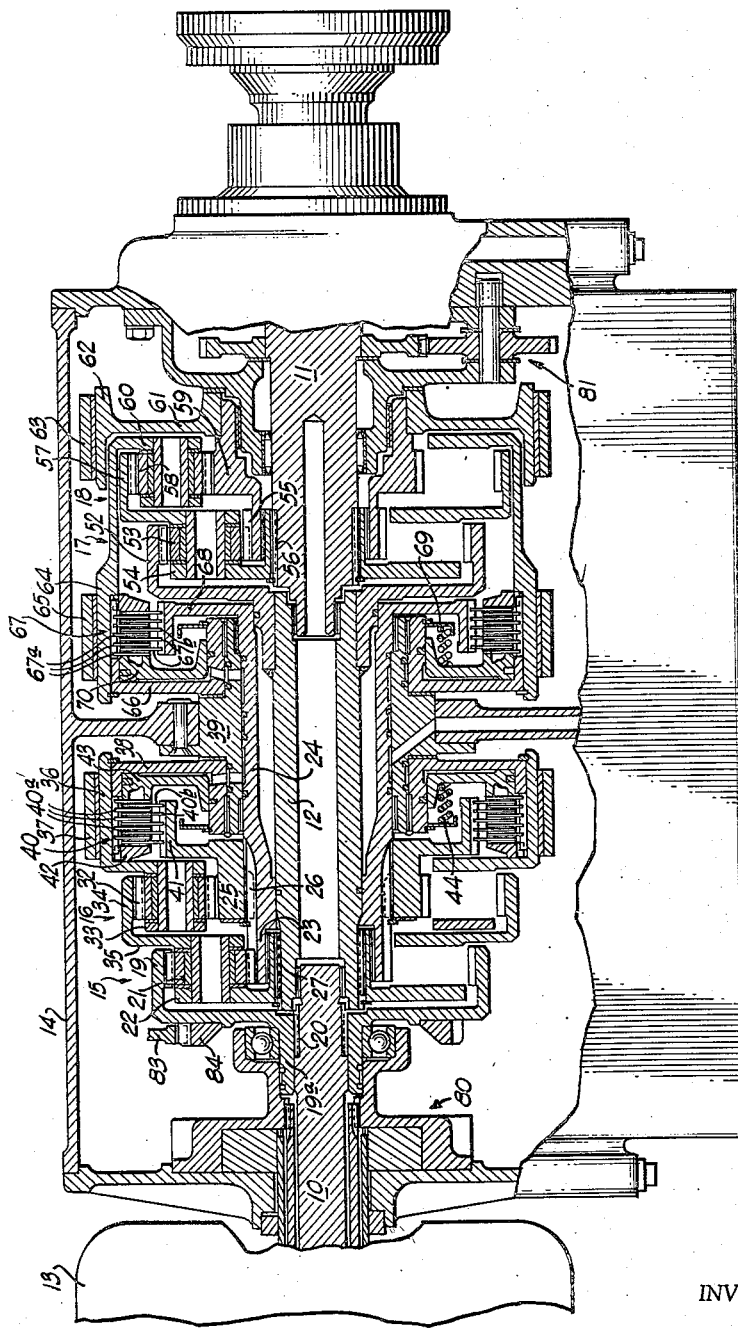
Fig. 1 is a longitudinal view, principally in section and partly broken away, illustrating a transmission characterized by the features of the present invention.

In accordance with the present invention, the foregoing and other objects are realized by providing a transmission including four simple planetary gear sets, two of which function as an input gear group while the other two function as an output gear group. One of the input sets has an input element driven from the engine of the vehicle through a torque converter or the like while the two output gear sets have common elements connected to the output shaft of the transmission. A band brake associated with the two input gear sets provides major reduction therein while a multiple-disk friction clutch may be selectively actuated to interconnect two of the elements of the input gear sets to provide a direct drive therethrough. A pair of band brakes associated with the output gear sets provide major and minor speed reductions therein. The input gear sets include a pair of output elements, one of which is fixedly connected to a first input element of the output sets and the other of which is adapted to be connected through a second multiple-disk friction clutch to a second input element of the output gear sets, thereby to provide dual paths of power flow between the two gear groups. As previously indicated, the three described band brakes and the two multiple-disk friction clutches may be selectively actuated in different pairs in order to provide five forward speed ratios and a reverse drive through the transmission.

Referring now to the drawings, and more particularly to Figs. 1 and 2 thereof, there is disclosed a mechanism for transferring drive from a drive shaft 10 to a driven shaft 11 by way of an intermediate shaft 12 axially aligned with and disposed between the drive and driven shafts. As is illustrated in Fig. 1, the drive shaft 10 may be connected to the output member of a torque converter or fluid coupling 13 as is conventional in this art. The output shaft 11 is, of course, adapted to be connected through conventional differential gearing and other suitable connecting means to the wheels of the vehicle.

As is also shown in Fig. 1, the shafts 10, 11 and 12 have mutually telescoping end portions and are journaled within a suitable transmission casing 14. The latter casing also houses a pair of gear groups connected in tandem between the drive and driven shafts, the input gear group consisting of a pair of simple, single pinion type planetary gear sets respectively indicated by numerals 15 and 16 and the output gear group consisting of a somewhat similar pair of simple, single pinion type planetary gear sets respectively indicated by the numerals 17 and 18.

The planetary gear set 15 has an input ring gear 19 which includes a sleeve portion 19a splined to the inwardly disposed end of the input shaft 10 as is indicated at 20. The gear set 15, in addition to the ring gear 19, comprises a plurality of planet pinions 21 spaced equal distances apart and rotatably mounted upon a planet carrier 22, with three such pinions preferably being provided. The planet carrier 22 is splined to the intermediate shaft 12 as indicated by reference numeral 27. The pinions 21, of course, mesh with the ring gear 19 and with a sun gear 23 formed upon an elongated sleeve 24 encircling and mounted for rotation about the intermediate shaft 12. A sun gear 25 of the gear set 16 is nonrotatably secured to the sleeve 24 as indicated at 26. The gear set 16 comprises, in addition to the sun gear 25, a plurality of equidistantly spaced planet pinions 32, preferably three in number, which are rotatably supported upon a planet carrier 33 and which mesh with a ring gear 34 formed upon an integral extension 35 of the planet carrier 22. The planet carrier 33 is provided with an extension forming an annular brake drum 36 which may be held stationary by a band brake 37 in order to provide torque reaction for the input gear group and establish a major speed reduction therein. The drum 36 is splined or otherwise attached to a clutch housing 38 which is rotatably disposed about a web 39 of the casing 14. The latter web is interposed between the sleeve 24 of the sun gear 23 and the housing 38 and carries suitable bearings to permit rotation of these elements.

The clutch housing 38 encloses a multiple-disk type friction clutch 40 of conventional construction having a plurality of interleaved clutch plates 40a and 40b respectively carried by the drum 36 and by an integral extension 41 formed on the sun gear 25. The plates of the clutch 40 are disposed between an annular backing plate 42 splined to the drum 36 and an annular piston 43 longitudinally movable within the housing. Suitable biasing springs 44 (Fig. 1) acting against the piston 43 normally maintain the clutch plates in disengaged position. Application of fluid pressure to the face of the piston 43 moves the clutch plates 40a and 40b into frictional engagement whereupon the sun gear 25 and the planet carrier 33 of the gear set 16 are interconnected and a direct drive is provided through both of the input gear sets to the intermediate shaft 12. Specifically, when the clutch 40 is energized to lock up the gear set 16 in the manner described, the gear elements of the set 15 are also locked up, due to the fact that two of the gear elements of the set 16, i. e., the sun gear 25 and the ring gear 34, are respectively connected to two of the elements of the gear set 15, i. e., the sun gear 23 and the planet carrier 22.

The rear or output gear group, as indicated above, consists of the planetary gear sets 17 and 18. The planetary gear set 17 comprises a ring gear 52 secured to the intremediate shaft 12, with the result that this ring gear is permanently connected to be driven by the planet carrier 22 of the gear set 15 and hence may be considered to be a first input element of the rear planetary gear group, while the planet carrier 22 may be referred to as a first output element of the input gear group. The gear set 17 further comprises a plurality of equidistantly spaced planet pinions 53 rotatably mounted upon a planet carrier 54 and meshing both with the ring gear 52 and with a sun gear 55. The planet carrier 54, as indicated at 56, is splined to the output shaft 11 and is connected directly to ring gear 57 of the gear set 18. The latter gear set, in addition to the ring gear 57, comprises a plurality of equidistantly spaced pinions 58, preferably three in number, rotatably mounted upon a planet carrier 60 and mashing both with the ring gear 57 and with a sun gear 59 which is integral with the sun gear 55 of the gear set 17. An integral extension formed on the common sun gear 55—59 terminates in a brake drum 62 which is adapted to be engaged and held by a band brake 63 in order to provide a minor reduction in the rear planetary gear group. An elongated cylindrical drum 64 formed integrally with the planet carrier 60 and encircling the gear sets 17 and 18 is adapted to be engaged and held by a band brake 65 in order to hold the planet carrier 60 and provide major speed reduction through the rear group.

The brake drum 64 also carries a clutch housing 66 for a second multiple-disk friction type clutch 67 which is similar in construction to the clutch 40 described above. Thus, the clutch 67 comprises interleaved plates 67a and 67b respectively carried by the drum 64 and by an integral extension 68 on the sleeve 24 of the sun gear 23. The web 39 extends between the sleeve 24 and the housing 66 and suitable bearings are disposed between the contiguous surfaces of these elements. Clutch plates 67a and 67b are normally held in disengaged position by means of biasing springs 69 acting against piston 70. When the plates of the clutch 67 are engaged by application of fluid pressure to the face of the piston 70 in opposition to the biasing springs, the sun gear 25 of the gear set 15 is connected directly to the planet carrier 60 of the gear set 18 and, accordingly, the sun gear 25 may be considered to be a second output element from the input gear group and the planet carrier 60 may be considered to be a second input element to the rear planetary gear group.

The transmission casing 14 also encloses front and rear pumps 80 and 81 of conventional construction which perform the functions of pressurizing and feeding oil to the torque converter or fluid coupling 13, providing lubrication for the transmission gearing, for cooling the friction brakes and clutches, if necessary, and also for providing fluid pressure to engage the friction brakes and clutches.

To provide power take-off for driving auxiliary equipment on the vehicle, a reach-in type adapter may be inserted through an opening provided in the casing 14 until its driven gear 83 engages an externally toothed portion 84 formed on the ring gear 19. The provision of power take-off directly from the drive shaft insures that the auxiliary equipment will not be affected by the speed reductions provided by the transmission gearing and the use of an externally toothed ring gear as described allows the adapter to be driven when inserted only a small distance into the casing of the transmission, thus providing convenience of installation.

As previously indicated, the transmission of the present invention is particularly well suited for use on trucks or heavy duty vehicles and, to this end, provides a neutral condition, together with five forward speed drive ratios and a single reverse drive. The transmission may be operated either automatically or manually by simultaneously applying different pairs of the clutches and brakes. For automatic operation the clutches 40 and 67 and the brakes 37, 63 and 65 may be operated by the selective application of hydraulic pressure from any suitable control mechanism, as will be readily understood by those skilled in this art.

In neutral condition both of the clutches and all three of the brakes are disengaged, whereupon torque will be transmitted from the vehicle engine through the torque converter 13 to the drive shaft 10, thereby to effect rotation of the input ring gear 19 for the input gear group and also to drive the power take-off gear 83. No torque is transmitted to the driven shaft 11 in view of the absence of reaction elements in all four of the gear sets 15, 16, 17 and 18.

As will be apparent from a study of the table shown in Fig. 3, the first forward speed ratio is established by simultaneously applying the brakes 37 and 65, thereby effecting major speed reductions in both the input and output gear groups. It will be understood that, at this time, the brake 63 and the clutches 40 and 67 are not engaged. Rotation of the drive shaft 10 and the ring gear 19 causes a portion of the drive to pass through the planet pinions 21, through the planet carrier 22, and through the intermediate shaft 12 to the ring gear 52 of the output planetary gear group. Power also flows from the pinions 21 through sun gears 23 and 25, through planet pinions 32 to the ring gear 34 which is connected to the intermediate shaft 12. A portion of the power delivered by the intermediate shaft to the output gear group flows from the ring gear 52 to the planet pinions 53 and then to the planet carrier 54 which is attached to the driven shaft 11. Power also flows from the planet pinions 53 to the sun gear 55, and through the planet pinions 58 to the ring gear 57, which is also connected directly to the driven shaft 11.

The second forward speed ratio is obtained by releasing the band brake 37 and applying the clutch 67 while holding the brake 65 applied. Actuation of the clutch 67 connects the sun gears 23 and 25 to the applied band brake 65 to place the input gear group in minor speed reduction while the output gear group remains in major reduction. Under these conditions the drive flow through the first planetary gear set to the intermediate shaft passes from ring gear 19 through planet pinions 21 and through planet carrier 22 while in the output planetary gear group the drive flows from the ring gear 52 to the driven shaft 11 in the manner described above for first speed. There is, of course, no second path for power flow in the input gear group in second speed.

The third forward speed ratio is obtained by releasing the clutch 67 and actuating the clutch 40, while at the same time holding the brake 65 applied. With the clutch 40 applied, the input gear group is locked for direct drive therethrough to the shaft 12, while the output gear group obviously remains in major reduction. The power flow from the intermediate shaft 12 is, of course, exactly as described above for first speed.

The fourth forward speed drive is established by releasing the brake 65 and applying the brake 63, while at the same time maintaining the clutch 40 applied. With the clutch 40 applied, the planet carrier 33 is connected directly to the sun gear 25, with the result that the gear elements of the set 16 are locked up and rotate as a unit, thereby establishing a direct drive from the ring gear 19 to the intermediate shaft 12. With brake 63 applied, the output planetary gear group is in minor reduction with the power flowing from the ring gear 52 through the planet pinions 53 and through the planet carrier 54 to the output shaft 11.

The fifth forward speed ratio is obtained by maintaining the clutch 40 applied and applying also clutch 67. This locks up both the input and output gear groups and produces direct drive from input shaft 10 to output shaft 11.

Reverse drive is effected by simultaneously applying the clutch 67 and the band brake 37. As indicated above, major speed reduction is provided in the first set with the brake 37 applied. With the clutch 67 applied, the sun gear 23 of the set 15 is connected to drive the planet carrier 60 of the set 18, with the result that a dual path of power flow from the input gear group to the output gear group is provided. The first such path of power flow passes from the gear sets 15 and 16 to the carrier 22 connected to the intermediate shaft 12, while the second path includes the sun gear 23, the clutch 67 and the planet carrier 60. The output planetary gear group functions to recombine these two paths of power flow and produces a reverse drive of the driven shaft 11.

In view of the foregoing description it will be recognized that the transmission of the present invention provides five forward speed ratios and a reverse drive between the input shaft and the output shaft, with each of these drives being effected by the simultaneous application of a pair of controllable friction devices. Moreover, it will be recognized that in the transition from first to fifth speed the change between two adjacent ratios is effected by releasing only one friction device and simultaneously engaging another, thereby preventing the interruption of torque from the driven shaft 10.

While a particular embodiment of the invention has been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. A multiple speed transmission comprising an input shaft, an output shaft, an intermediate shaft disposed between said input and output shafts, first and second single pinion type planetary gear sets connected between said input shaft and said intermediate shaft, third and fourth single pinion type planetary gear sets connected between said intermediate shaft and said output shaft, each of said gear sets including a sun gear, a ring gear and a planet pinion meshing with said sun and ring gears and rotatably supported upon a planet carrier, the ring gear of the first set being connected to said input shaft and the planet carrier of the first set being connected directly to said intermediate shaft and to the ring gear of the second set, means connecting the sun gears of the first and second sets directly together for rotation in unison, means including a first clutch for locking up the first set to provide a direct drive from the input shaft to the intermediate shaft, means including a first brake for holding the planet carrier of the second set to provide a major speed reduction in the first and second sets, the ring gear of the third set being connected to said intermediate shaft, the planet carrier of the third set being connected to the output shaft and to the ring gear of the fourth set, means connecting the sun gears of the third and fourth sets together for joint rotation, a second brake for holding the planet carrier of the fourth set to provide major speed reduction through the third and fourth sets, a third brake for holding the sun gears of the third and fourth sets to provide minor speed reduction therethrough, and means including a second clutch operable to connect the planet carrier of the fourth set to the sun gear of the first set, said two clutches and three brakes being selectively operable in different pairs to provide at least five forward speed ratios and a reverse drive between said input and output shafts.

2. The transmission defined by claim 1 wherein the ring gear of the first gear set includes an externally toothed portion for the purpose of providing power take-off.

3. A multiple speed transmission comprising an input shaft, an output shaft, an intermediate shaft disposed between said input and output shafts, first and second single pinion type planetary gear sets connected between said input shaft and said intermediate shaft, third and fourth single pinion type planetary gear sets connected between said intermediate shaft and said output shaft, each of said gear sets including a sun gear, a ring gear and a planet pinion meshing with said sun and ring gears and rotatably supported upon a planet carrier, the ring gear of the first set being connected to said input shaft and the planet carrier of the first set being connected directly to said intermediate shaft and to the ring gear of the second set, means connecting the sun gears of the first and second sets directly together for rotation in unison, means including a first clutch for locking the planet carrier of the second set to the sun gear of the second set, means including a first brake for holding the planet carrier of the second set to provide a major speed reduction in the first and second sets, the ring gear of the third set being connected to said intermediate shaft, the planet carrier of the third set being connected to the output shaft and to the ring gear of the fourth set, means connecting the sun gears of the third and fourth sets together for joint rotation, a second brake for holding the planet carrier of the fourth set to provide major speed reduction through the third and fourth sets, a third brake for holding the sun gears of the third and fourth sets to provide minor speed reduction therethrough, and means including a second clutch operable to connect the planet carrier of the fourth set to the sun gears of the first and second sets, said two clutches and three brakes being selectively operable in different pairs to provide at least five forward speed ratios and a reverse drive between said input and output shafts.

4. A multiple speed transmission comprising an input shaft, an output shaft, an intermediate shaft disposed between said input and output shafts, first and second single pinion type planetary gear sets connected between said input shaft and said intermediate shaft, third and fourth single pinion type planetary gear sets connected between said intermediate shaft and said output shaft, each of said gear sets including a sun gear, a ring gear and a planet pinion meshing with said sun and ring gears and rotatably supported upon a planet carrier, the ring gear of the first set being connected to said input shaft and the planet carrier of the first set being connected directly to said intermediate shaft and to the ring gear of the second set, means connecting the sun gears of the first and second sets directly together for rotation in unison, means including a first clutch for locking up the first and second sets to provide a direct drive from the input shaft to the intermediate shaft, means including a first brake for holding the planet carrier of the second set to provide a major speed reduction in the first and second sets, the ring gear of the third set being connected to said intermediate shaft, the planet carrier of the third set being connected to the output shaft and to the ring gear of the fourth set, means connecting the sun gears of the third and fourth sets together for joint rotation, a second brake for holding the planet carrier of the fourth set to provide major speed reduction through the third and fourth sets, a third brake for holding the sun gears of the third and fourth sets to provide minor speed reduction therethrough, and means including a second clutch operable to connect the planet carrier of the fourth set to the sun gears of the first and second sets, said two clutches and three brakes being selectively operable in different pairs to provide at least five forward speed ratios and a reverse drive between said input and output shafts, the first forward speed ratio being obtained by simultaneously applying said first and second brakes, the second forward speed ratio being obtained by simultaneously applying said second brake and said second clutch, the third forward speed ratio being obtained by simultaneously applying said second brake and said first clutch, the fourth forward speed ratio being obtained by simultaneously applying said first clutch and said third brake, the fifth forward speed ratio being obtained by simultaneously applying said first and second clutches, and the reverse drive being obtained by simultaneously applying said first brake and said second clutch.

5. A multiple speed transmission comprising an input shaft, an output shaft, an intermediate shaft disposed between said input and output shafts, first and second single pinion type planetary gear sets connected between said input shaft and said intermediate shaft, third and fourth single pinion type planetary gear sets connected between said intermediate shaft and said output shaft, each of said gear sets including a sun gear, a ring gear, and a planet pinion meshing with said sun and ring gears and rotatably supported upon a planet carrier, the ring gear of the first set being connected to said input shaft and the planet carrier of the first set being connected directly to said intermediate shaft and to the ring gear of the second set, means connecting the sun gears of the first and second sets directly together for rotation in unison, means including a first clutch for locking the planet carrier of the second set to the sun gear of the second set, means including a first brake for holding the planet carrier of the second set to provide a major speed reduction in the first and second sets, the ring gear of the third set being connected to said intermediate shaft, the planet carrier of the third set being connected to the output shaft and to the ring gear of the fourth set, means connecting the sun gears of the third and fourth sets together for joint rotation, a second brake for holding the planet carrier of the fourth set to provide major speed reduction through the third and fourth sets, a third brake for holding the sun gears of the third and fourth sets to provide minor speed reduction therethrough, and means including a second clutch operable to connect the planet carrier of the fourth set to the sun gears of the first and second sets, said two clutches and three brakes being selectively operable in different pairs to provide at least five forward speed ratios and a reverse drive between said input and output shafts, the first forward speed ratio being obtained by simultaneously applying said first and second brakes, the second forward speed ratio being obtained by simultaneously applying said second brake and said second clutch, the third forward speed ratio being obtained by simultaneously applying said second brake and said first clutch, the fourth forward speed ratio being obtained by simultaneously applying said first clutch and said third brake, the fifth forward speed ratio being obtained by simultaneously applying said first and second clutches, and the reverse drive being obtained by simultaneously applying said first brake and said second clutch.

6. The transmission defined by claim 5 wherein the ring gear of the first gear set is provided with an externally toothed portion for the purpose of providing power take-off.

7. A multiple speed transmission comprising an input shaft, an output shaft, an intermediate shaft disposed between said input and output shafts, first and second single pinion type planetary gear sets connected between said input shaft and said intermediate shaft, third and fourth single pinion type planetary gear sets connected between said intermediate shaft and said output shaft, each of said gear sets including a sun gear, a ring gear and a planet pinion meshing with the sun and ring gears and rotatably supported upon a planet carrier, the ring gear of the first set being connected to said input shaft and the planet carrier of the first set being connected directly to said intermediate shaft and to the ring gear of the second set, the sun gear of the first set being formed upon an elongated sleeve encircling said intermediate shaft, the sun gear of the second set being affixed to said sleeve, the planet carrier of the second set being secured to a first drum, means including a first clutch for locking the drum to the sun gear of the second set, means including a first brake for holding the drum stationary to provide a major speed reduction in the first and second sets, the ring gear of the third set being connected to said intermediate shaft, the planet carrier of the third set being connected to the output shaft and to the ring gear of the fourth set, means connecting the sun gears of the third and fourth sets together for joint rotation, the planet carrier of the fourth set being formed upon an elongated drum encircling the third and fourth sets, a second brake for holding the elongated drum to provide major speed reduction through the third and fourth sets, a third brake for holding the sun gears of the third and fourth sets to provide minor speed reduction therethrough, and means including a second clutch operable to connect said sleeve and said elongated drum, said two clutches and three brakes being selectively operable in different pairs to provide at least five forward speed ratios and a reverse drive between said input and output shafts.

8. A multiple speed transmission comprising an input shaft, an output shaft, an intermediate shaft disposed between said input and output shafts, first and second single pinion type planetary gear sets connected between said input shaft and said intermediate shaft, third and fourth single pinion type planetary gear sets connected between said intermediate shaft and said output shaft, each of said gear sets including a sun gear, a ring gear and a planet pinion meshing with the sun and ring gears and rotatably supported upon a planet carrier, the ring gear of the first set being connected to said input shaft and the planet carrier of the first set being connected directly to said intermediate shaft and to the ring gear of the second set, the sun gear of the first set being formed upon an elongated sleeve encircling said intermediate shaft, the sun gear of the second set being affixed to said sleeve, the planet carrier of the second set being secured to a first drum, means including a first clutch for locking the drum to the sun gear of the second set, means including a first brake for holding the drum stationary to provide a major speed reduction in the first and second sets, the ring gear of the third set being connected to said intermediate shaft, the planet carrier of the third set being connected to the output shaft and to the ring gear of the fourth set, means connecting the sun gears of the third and fourth sets together for joint rotation, the planet carrier of the fourth set being formed upon an elongated drum encircling the third and fourth sets, a second brake for holding the elongated drum to provide major speed reduction through the third and fourth sets, a third brake for holding the sun gears of the third and fourth sets to provide minor speed reduction therethrough, and means including a second clutch operable to connect said sleeve and said elongated drum, said two clutches and three brakes being selectively operable in different pairs to provide at least five forward speed ratios and a reverse drive between said input and output shafts, the first forward speed ratio being obtained by simultaneously applying said first and second brakes, the second forward speed ratio being obtained by simultaneously applying said second brake and said second clutch, the third forward speed ratio being obtained by simultaneously applying said second brake and said first clutch, the fourth forward speed ratio being obtained by simultaneously applying said first clutch and said third brake, the fifth forward speed ratio being obtained by simultaneously applying said first and second clutches, and the reverse drive being obtained by simultaneously applying said first brake and said second clutch.

No references cited.